(12) United States Patent
Muramatsu

(10) Patent No.: US 7,385,643 B2
(45) Date of Patent: Jun. 10, 2008

(54) IMAGE PICKUP APPARATUS UTILIZING A GEOMAGNETIC SENSOR

(75) Inventor: Toshihiko Muramatsu, Iwata-gun (JP)

(73) Assignee: Yamaha Corporation, Hamamatsu-shi (JP)

( * ) Notice: Subject to any disclaimer, the term of this patent is extended or adjusted under 35 U.S.C. 154(b) by 710 days.

(21) Appl. No.: 10/324,865

(22) Filed: Dec. 19, 2002

(65) Prior Publication Data

US 2003/0122945 A1    Jul. 3, 2003

(30) Foreign Application Priority Data

Dec. 27, 2001  (JP)  ............................. P2001-398357

(51) Int. Cl.
*H04N 5/225* (2006.01)
*H04N 9/04* (2006.01)
*H04N 5/228* (2006.01)

(52) U.S. Cl. ............... 348/373; 348/207.99; 348/208.2

(58) Field of Classification Search ................ 396/502, 396/263; 348/207.99, 208.2, 373
See application file for complete search history.

(56) References Cited

U.S. PATENT DOCUMENTS

| | | | | |
|---|---|---|---|---|
| 4,025,930 A | * | 5/1977 | Wolff | 396/29 |
| 4,107,988 A | * | 8/1978 | Polsky | 73/178 R |
| 4,223,228 A | * | 9/1980 | Kaplan | 378/205 |
| 4,250,626 A | * | 2/1981 | Lazar | 33/363 R |
| 5,262,867 A | * | 11/1993 | Kojima | 348/39 |
| 5,614,981 A | * | 3/1997 | Bryant et al. | 396/50 |
| 6,144,761 A | * | 11/2000 | Kaneko et al. | 382/154 |
| 6,282,362 B1 | * | 8/2001 | Murphy et al. | 386/46 |
| 6,536,123 B2 | * | 3/2003 | Tamura | 33/356 |
| 6,795,110 B1 | * | 9/2004 | Kossin | 348/81 |

FOREIGN PATENT DOCUMENTS

| | | |
|---|---|---|
| JP | H05-161046 | 6/1993 |
| JP | H09-080623 | 3/1997 |
| JP | 09-247512 | 9/1997 |
| JP | H09-247512 | 9/1997 |
| JP | H10-122857 | 5/1998 |
| JP | H10-160474 | 6/1998 |
| JP | 2000-035611 | 2/2000 |

OTHER PUBLICATIONS

Notice of Rejection dated Nov. 16, 2004 issued with respect to corresponding Japanese patent application No. 2001-398357.

* cited by examiner

*Primary Examiner*—Lin Ye
*Assistant Examiner*—Richard M Bemben
(74) *Attorney, Agent, or Firm*—Pillsbury Winthrop Shaw Pittman LLP

(57) ABSTRACT

An image pickup apparatus comprises an image pickup device (e.g., a lens, a CCD) for picking up an image of an object, a shutter button having a magnetic member thereunder, an XY-axes geomagnetic sensor, a decoder for decoding an output of the XY-axes geomagnetic sensor to produce a bearing angle and an inclined angle based on a horizontal plane, a viewfinder display for displaying the bearing angle and inclined angle on the screen of a viewfinder. When the user presses the shutter button, the magnetic member approaches the geomagnetic sensor, so that a relatively large magnetic field (1 Oe) is applied to the geomagnetic sensor, and the image pickup device is controlled to perform an image pickup operation. It is possible to further incorporate a memory (e.g., ROM) for storing relationships between the geomagnetism, bearing angle, and inclined angle with respect to a prescribed terrestrial location.

4 Claims, 8 Drawing Sheets

FIG. 4

| Vx (Oe) | Vy (Oe) | BEARING ANGLE (deg) | INCLINED ANGLE (deg) |
|---|---|---|---|
| -0.35 | 0.08 | 256 | 1 |
| -0.35 | 0.06 | 257 | 1 |
| -0.35 | 0.05 | 259 | 3 |
| -0.35 | 0.03 | 260 | 4 |
| -0.35 | 0.02 | 262 | 5 |
| -0.35 | 0.00 | 264 | 6 |
| OMISSION | | | |
| -0.35 | -0.17 | 270 | 33 |
| -0.35 | -0.18 | 270 | 36 |
| -0.33 | 0.12 | 247 | 0 |
| -0.33 | 0.11 | 248 | 1 |
| OMISSION | | | |
| -0.33 | -0.23 | 278 | 39 |
| -0.33 | -0.24 | 279 | 42 |
| -0.32 | 0.15 | 240 | 0 |
| -0.32 | 0.14 | 242 | 1 |
| OMISSION | | | |
| 0.00 | -0.41 | 360 | 28 |
| 0.00 | -0.42 | 360 | 38 |
| 0.02 | 0.30 | 178 | 0 |
| 0.02 | 0.29 | 177 | 2 |
| OMISSION | | | |
| 0.33 | -0.23 | 82 | 39 |
| 0.33 | -0.24 | 81 | 42 |
| 0.35 | 0.08 | 105 | 1 |
| 0.35 | 0.06 | 103 | 1 |
| OMISSION | | | |
| 0.35 | -0.17 | 90 | 36 |
| 0.35 | -0.18 | 90 | 42 |
| 1 OR MORE | 1 OR MORE | IMAGE PICKUP ON | | though the embodiment of this description, the shutter button and the geomagnetic sensor placement appears in the original.

IMAGE PICKUP APPARATUS UTILIZING A GEOMAGNETIC SENSOR

BACKGROUND OF THE INVENTION

1. Field of the Invention

This invention relates to image pickup apparatuses such as electronic still cameras, digital cameras, video movie cameras, and the like, which incorporate magnetic sensors for measurement of positions and directions.

2. Description of the Related Art

Conventionally, image pickup apparatuses such as electronic cameras and video cameras incorporate date functions for automatically calculating times and dates therefor. In order to produce a certain degree of levelness, image pickup apparatuses are each coupled with a single level externally arranged therefor.

Japanese Unexamined Patent Publication No. Hei 9-247512 discloses an example of an electronic camera incorporating a geomagnetic sensor (or a bearing sensor), which allows an angular position thereof to be displayed or recorded.

The conventional image pickup apparatuses use shutters of a so-called 'contact switch type', for example.

The aforementioned image pickup apparatuses incorporating date functions are capable of merely recording times and dates together with images. Since conventional image pickup apparatuses may require levels externally provided therefor in order to produce levelness with respect to images being picked up, users cannot operate apparatuses to pick up images while simultaneously watching viewfinders. This may deteriorates the diversity of utility in handling image pickup apparatuses.

The electronic camera disclosed in Japanese Unexamined Patent Publication No. Hei 9-247512 incorporates a geomagnetic sensor, which is merely used for measurement of bearings therefor.

In addition, image pickup apparatuses using shutters of the contact switch type have problems that shutters may easily fail due to contact problems.

SUMMARY OF THE INVENTION

It is an object of the invention to provide an image pickup apparatus whose shutter does not easily fail due to contact problems and that provides a diversity of utility for the user.

An image pickup apparatus of this invention comprises an image pickup device (e.g., a lens, a CCD, etc.) for picking up an image of an object, a shutter button having a magnetic member thereunder, an XY-axes geomagnetic sensor, a decoder for decoding an output of the XY-axes geomagnetic sensor to produce a bearing angle and an inclined angle based on a horizontal plane, a viewfinder display for displaying the bearing angle and inclined angle on the screen of a viewfinder.

When the user presses the shutter button, the magnetic member is correspondingly moved downwardly to approach the geomagnetic sensor, so that a prescribed magnitude (1 Oe or more) of a magnetic field, which is sufficiently greater than the geomagnetism on the earth, is applied to the geomagnetic sensor. At this time, the image pickup device is automatically controlled to perform an image pickup operation.

The viewfinder display displays the bearing angle using characters and numbers together with an animated image representing a deviation of a present position in levelness from the horizontal plane on the screen.

In addition, it is possible to further incorporate a memory (e.g., ROM) that is adapted to the decoder to store relationships between the geomagnetism, bearing angle, and inclined angle with respect to a prescribed terrestrial location on the earth.

BRIEF DESCRIPTION OF THE DRAWINGS

These and other objects, aspects, and embodiments of the present invention will be described in more detail with reference to the following drawings, in which:

FIG. 4 shows an example of the content of a conversion table that is stored in a ROM incorporated in a decoder of the digital camera shown in FIG. 2;

DESCRIPTION OF THE PREFERRED EMBODIMENT

This invention will be described in further detail by way of examples with reference to the accompanying drawings.

Figure 1:
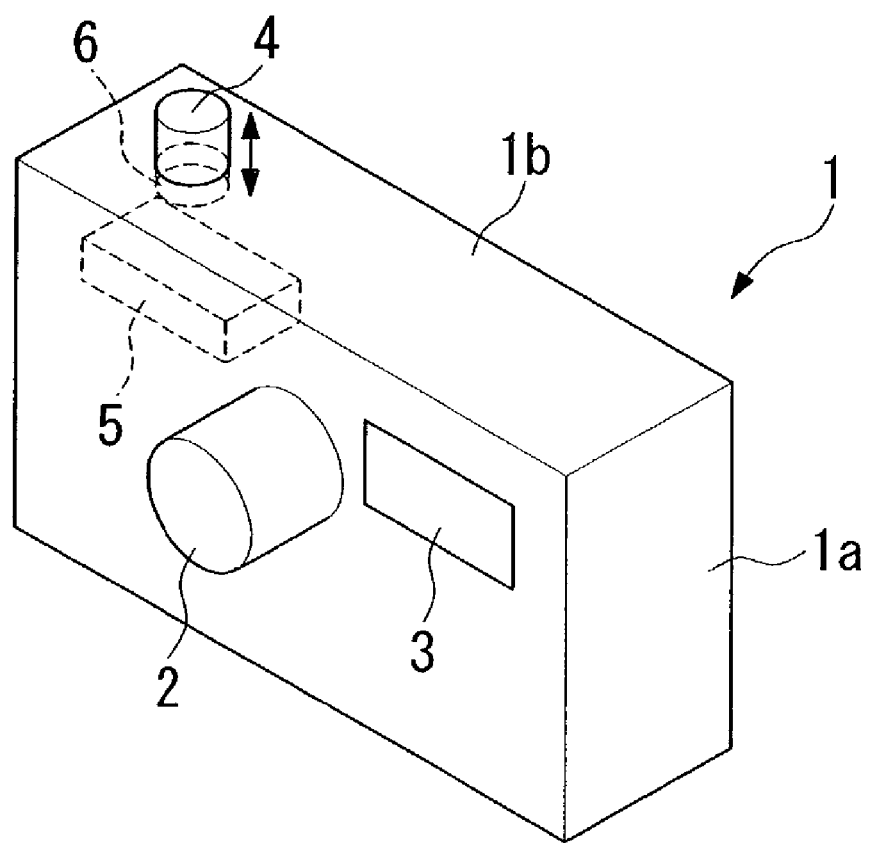
FIG. 1 is a perspective view showing the exterior appearance of a digital camera partly in section in accordance with a preferred embodiment of the invention.

FIG. 1 shows the exterior appearance of a digital camera partly in section as an application of this invention. That is, a digital camera 1 has a body 1a in which a lens (e.g., an objective lens) 2 and a finder window 3 are arranged in the front side. An XY-axes geomagnetic sensor 5 is incorporated in the body 1a of the digital camera 1 for use in measurement and detection of an angular position or direction (e.g., bearing) and an inclined angle (i.e., levelness) of the body 1a. The XY-axes geomagnetic sensor 5 is embedded at a prescribed position of the body 1a in proximity to a shutter button 4, which is projected above the upper surface of the body 1a. Specifically, the XY-axes geomagnetic sensor 5 measures a bearing angle with respect to a prescribed axial direction of the body 1a (or an image pickup direction) in which an image of an object is to be picked up, and an inclined angle (or levelness in the image pickup direction) that is formed between a prescribed axis of the body 1a and the horizontal plane.

The shutter button 4 has a magnetic member 6, which is located thereunder and is arranged substantially opposite to the XY-axes geomagnetic sensor 5 in the body 1a. That is, the shutter button 4 that is manually pressed and released is arranged in proximity to the XY-axes geomagnetic sensor 5 embedded in the body 1a in such a way that when pressed, the magnetic member 6 approaches to the XY-axes geomagnetic sensor 5.

The aforementioned shutter button 4 and the XY-axes geomagnetic sensor 5 are combined together to construct a switch unit 10 (see FIG. 2), which is a shutter mechanism functioning as a non-contact type switch.

The magnetic member 6 is made of a prescribed magnetic material, which is selected in such a way that when the shutter button 4 is pressed so that the magnetic member 6 arranged below the shutter button 4 is correspondingly moved downwardly and approaches to the upper surface of the XY-axes geomagnetic sensor 5 in the body 1a, a relatively large magnetic field whose magnitude is 1 Oe or more and which is sufficiently greater than the general geomagnetism, is applied to the XY-axes geomagnetic sensor 5.

Figure 2:
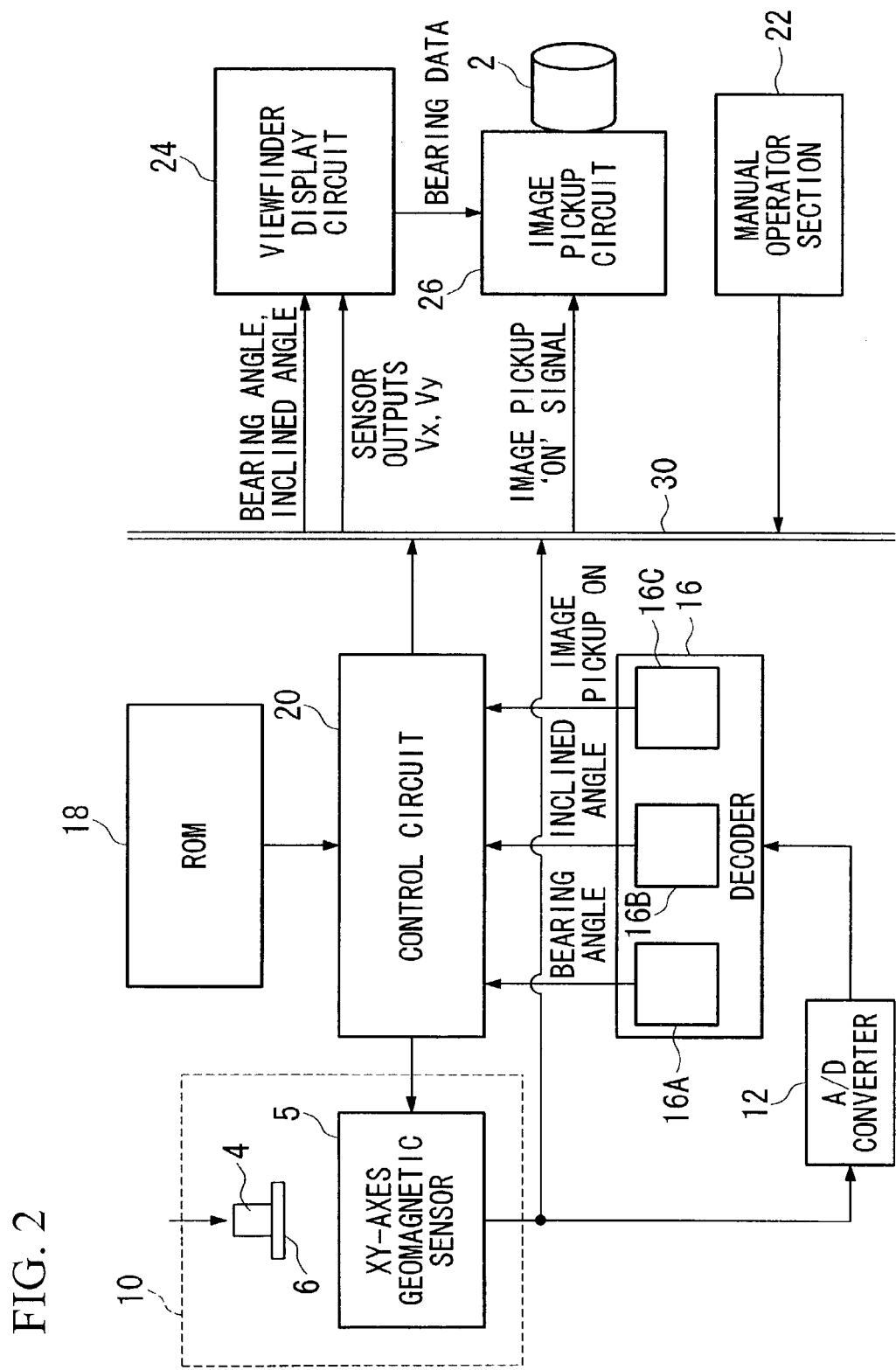
FIG. 2 is a block diagram showing the electronic configuration of the digital camera.

Next, the electronic configuration of the digital camera 1 will be described with reference to FIG. 2. As described above, the digital camera 1 has the switch unit 10 that has the shutter button 4 accompanied with the magnetic member 6 thereunder, and the XY-axes geomagnetic sensor 5. In addition, the digital camera 1 has an analog-to-digital (A/D) converter 12, a decoder 16, a ROM 18, a control circuit 20, a manual operator section 22, a viewfinder display circuit 24, and an image pickup circuit 26.

Figure 3:
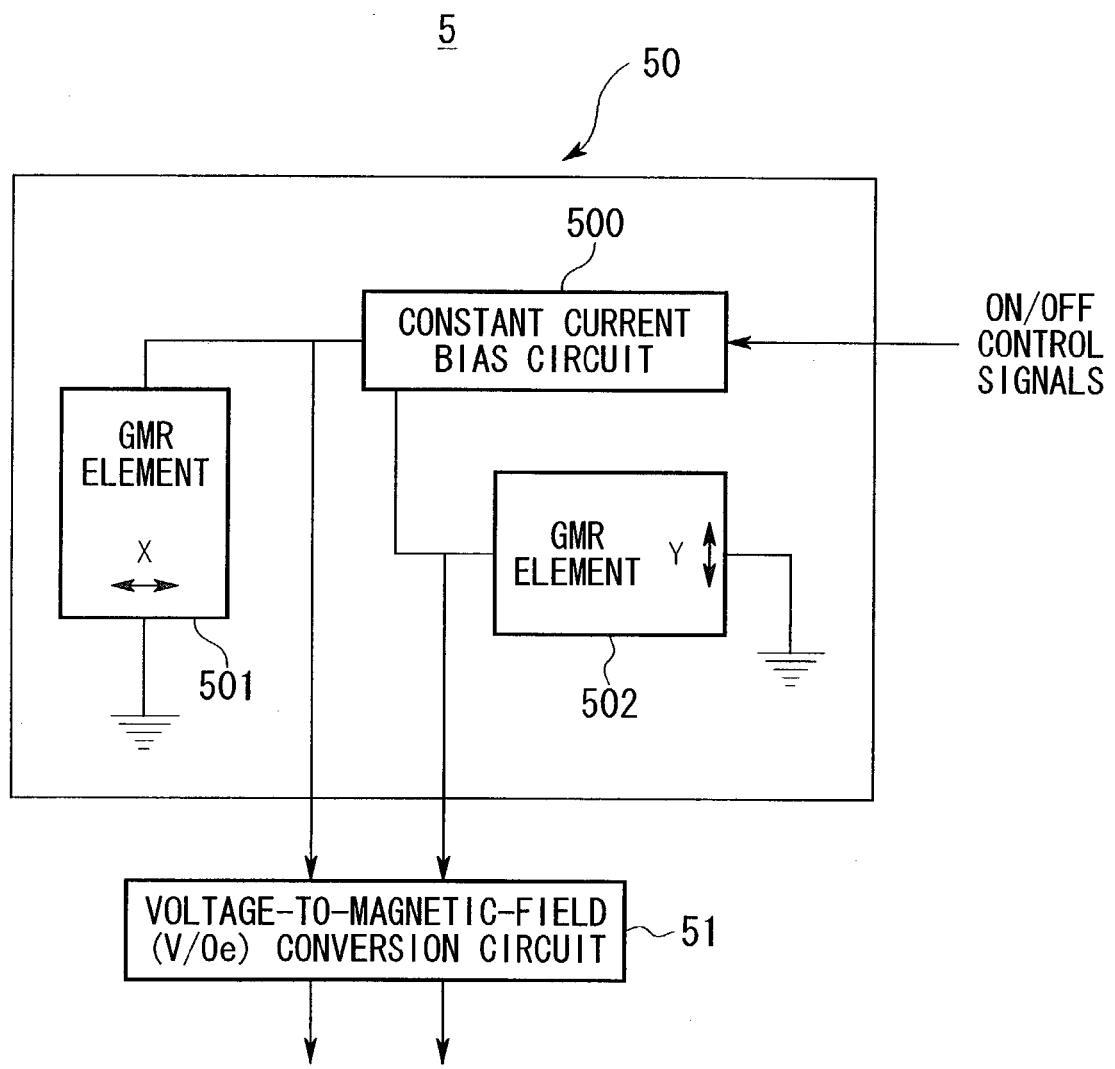
FIG. 3 is a block diagram showing the electronic configuration of an XY-axes geomagnetic sensor, which is embedded in the body of the digital camera in proximity to a shutter button.

FIG. 3 shows the detailed configuration of the XY-axes geomagnetic sensor 5, which is constituted by a GMR (Giant Magnetoresistive) circuit 50 and a voltage-to-magnetic-field conversion circuit 51.

The GMR circuit 50 comprises a constant current bias circuit 500 receiving ON/OFF control signals, an X-axis GMR element 501 for use in detection of an X-axis component of the geomagnetism, and a Y-axis GMR element 502 for use in detection of a Y-axis component of the geomagnetism.

Upon reception of an ON control signal, the constant current bias circuit 500 supplied a constant current to both the X-axis GMR element 501 and the Y-axis GMR element 502. Each of the GMR elements 501 and 502 is varied in resistance in response to variations of a magnetic field. By biasing these elements 501 and 502 using the constant current, it is possible to detect variations of the magnetic field in the form of variations of voltage. In the XY-axes geomagnetic sensor 5, when the X-axis GMR element 501 and the Y-axis GMR element 502 rotate respectively, variations occur in the X-axis component and Y-axis component of the geomagnetism, which is detected as variations of voltage.

When a magnetic field having magnitude of 1 Oe is applied to the body 1a of the digital camera 1 in an X-axis 'positive' direction, the X-axis GMR element 501 outputs '1' while the Y-axis GMR element 502 outputs '0'. When a magnetic field of 1 Oe is applied to the body 1a in an X-axis 'negative' direction, the X-axis GMR element 501 outputs '−1' while the Y-axis GMR element 502 outputs '0'. In addition, when a magnetic field having magnitude of 1 Oe is applied to the body 1a of the digital camera 1 in a Y-axis 'positive' direction, the X-axis GMR element 501 outputs '0' while the Y-axis GMR element 502 outputs '1'. When a magnetic field of 1 Oe is applied to the body 1a in a Y-axis 'negative' direction, the X-axis GMR element 501 outputs '0' while the Y-axis GMR element 502 outputs '−1'. That is, the GMR circuit 50 produces a certain voltage in response to the magnetic field applied to the body 1a of the digital camera 1, so that the voltage-to-magnetic-field conversion circuit 51 converts the output voltage of the GMR circuit 50 to a magnetic-field value.

The aforementioned output of the XY-axes geomagnetic sensor 5 is supplied to the decoder 16 via the A/D converter 12. The decoder 16 is constituted by three decoders, namely, a decoder 16A for detecting a bearing angle in picking up images in response to the output of the XY-axes geomagnetic sensor 5, a decoder 16B for detecting an inclined angle in response to the output of the XY-axes geomagnetic sensor 5, and a decoder 16C for making detection as to whether or not the shutter button 4 is pressed in response to the output of the XY-axes geomagnetic sensor 5.

The XY-axes geomagnetic sensor 5 produces output signals Vx and Vy, values of which are represented by the prescribed unit of 'Oe'. The decoder 16 incorporates a ROM for storing a conversion table (see FIG. 4) that shows relationships between the output signals Vx and Vy, and bearing angles (deg) and inclined angles (deg). With reference to the conversion table shown in FIG. 4, each of the three decoders 16A, 16B, and 16C detects a bearing angle and an inclined angle as well as a state of the shutter button 4 manually operated by the user.

According to the known responsive values against the geomagnetism in Japan, for example, each of the output values Vx and Vy of the XY-axes geomagnetic sensor 5 ranges from −0.35 Oe to +0.35 Oe. Therefore, the decoders 16A and 16B produce decoded values representing the bearing angle and inclined angle in correspondence with the output values Vx and Vy of the XY-axes geomagnetic sensor 5 in the aforementioned range. Incidentally, the bearing angle produced by the decoders 16A and 16B is an angle measured in a clockwise direction or a counterclockwise direction based on a specific direction (e.g., a south direction).

The decoder 16C produces another decoded values representing an image pickup ON signal, which shows that the shutter button 4 is operated by the user, when either the output value Vx or Vy of the XY-axes geomagnetic sensor 5 is equal to 1 Oe or more.

The ROM 18 stores various kinds of control programs and fixed data therein. The control circuit 20 execute control programs stored in the ROM 18 to control various parts and circuits of the digital camera 1. The manual operator section 22 provides various switches such as a power switch and other switches for use in setup of various functions. The viewfinder display circuit 24 displays a bearing angle (indicating an image pickup direction) and a degree of levelness of the body 1a on the screen of a viewfinder of the digital camera 1. In addition, it has a function of sending bearing data representing a bearing angle to the image pickup circuit 26.

The image pickup device 26 contains an image pickup device such as a CCD (Charge Coupled Device), wherein it drives an image pickup optical system (not shown) including the lens 2 so as to perform auto-focus controls for controlling the optical system to focus on an object (or objects), setup of image pickup conditions, drive controls of the image pickup device arranged on a prescribed image pickup plane, and image pickup operations under the control of the control circuit 20.

Figure 5:
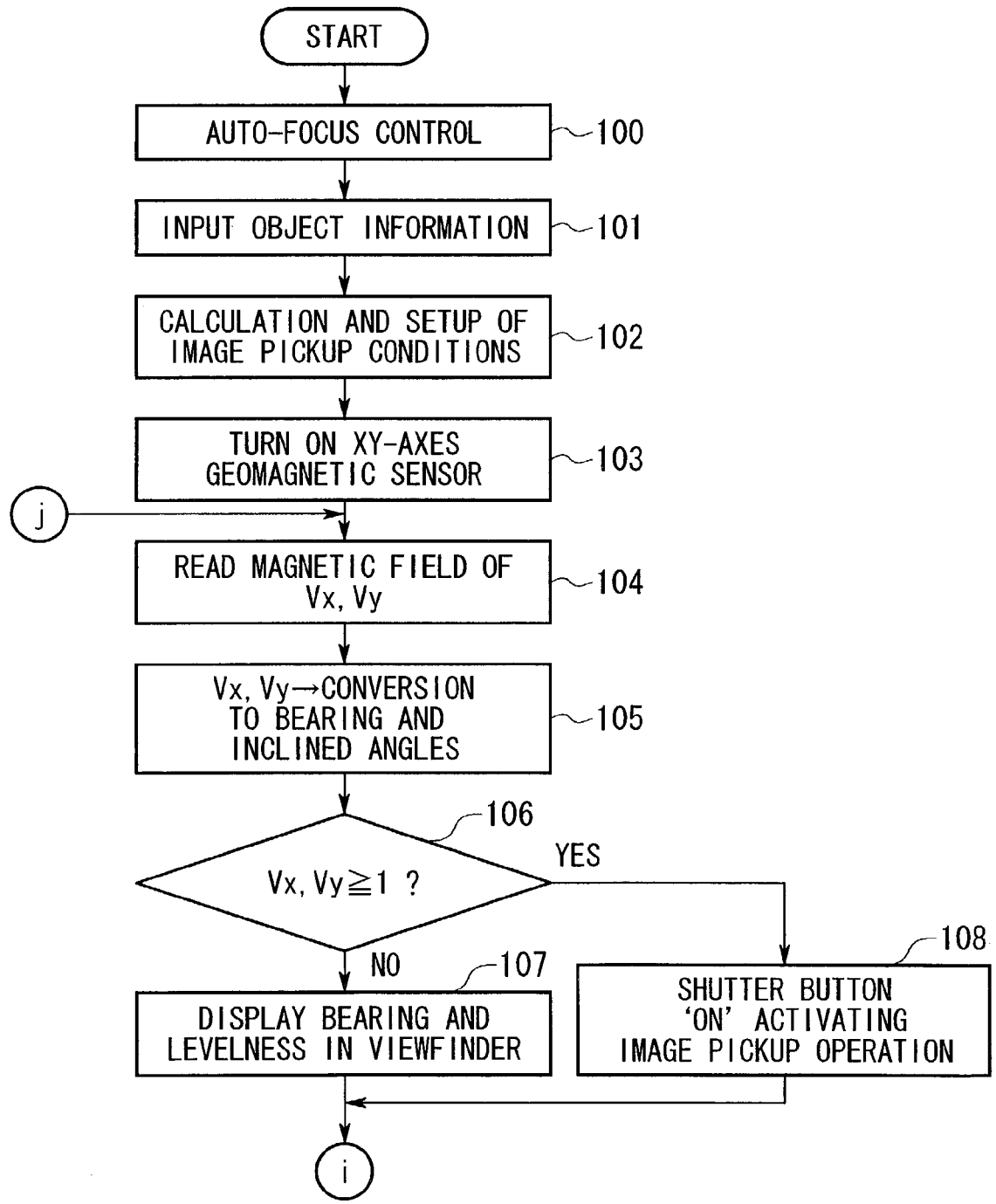
FIG. 5 is a flowchart showing a part of the overall operation of the digital camera.
Figure 6:
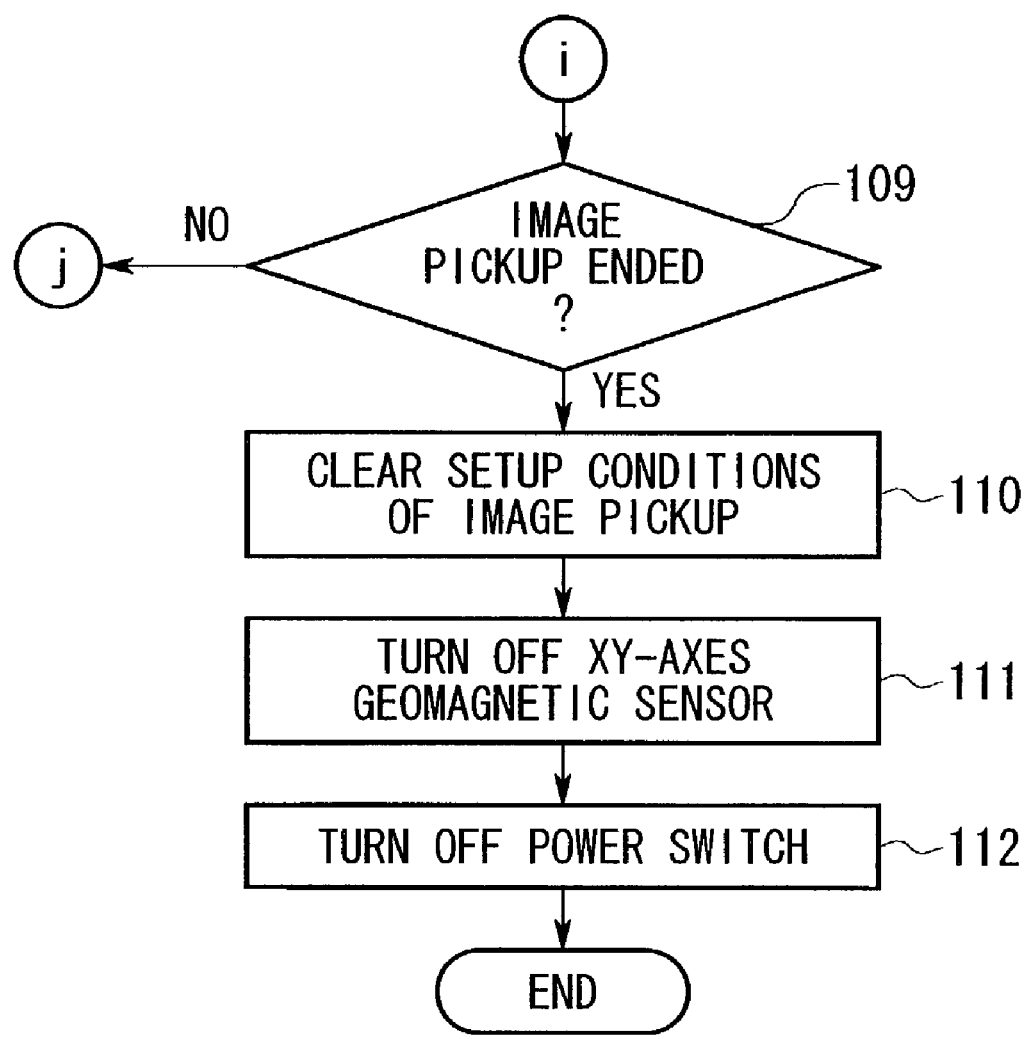
FIG. 6 is a flowchart showing another part of the overall operation of the digital camera.

Next, the overall operation of the digital camera 1 based on control programs, which are stored in the ROM 18 and are executed by the control circuit 20, will be described with reference to flowcharts shown in FIGS. 5 and 6. When the user of the digital camera 1 operates the power switch (not shown) of the manual operator section 22 to start control programs whose contents are shown in FIGS. 5 and 6. In FIG. 5, the flow firstly proceeds to step 100 in which the control circuit 20 performs an auto-focus control so as to drive the optical system to automatically focus on an object (or objects), an image of which is to be picked up. In step 101, the image pickup circuit 26 detects and inputs object information, in other words, object brightness (or luminance) information, via the viewfinder window 3.

In step 102, the image pickup circuit 26 calculates and sets up image pickup conditions such as a shutter speed and an aperture (or diaphragm) under the control of the control circuit 20. In step 103, the XY-axes geomagnetic sensor 5 is turned on in response to a control signal output from the control circuit 20. Specifically, the constant current bias circuit 500 of the XY-axes geomagnetic sensor shown in FIG. 3 supplies a constant current to the X-axis GMR element 501 and the Y-axis GMR element 502. Thus, the GMR elements 501 and 502 produce and output voltages to the voltage-to-magnetic-field conversion circuit 51, which in turn produces a magnetic field consisting of an X-axis component Vx and a Y-axis component Vy under the influence of the geomagnetism.

In step 104, the control circuit 20 reads the magnetic field consisting of the X-axis component Vx and Y-axis component Vy output from the XY-axes geomagnetic sensor 5. Then, the flow proceeds to step 105, wherein the A/D converter 12 converts the aforementioned components Vx and Vy of the magnetic field into digital values, which are then supplied to the decoder 16. With reference to the aforementioned conversion table of FIG. 4 stored in the ROM, the decoder 16A and 16B decode digital values into a bearing angle (indicating an image pickup direction) and an inclined angel (indicating a degree of levelness of the body 1a of the digital camera 1), which are then supplied to the control circuit 20.

Figure 9:
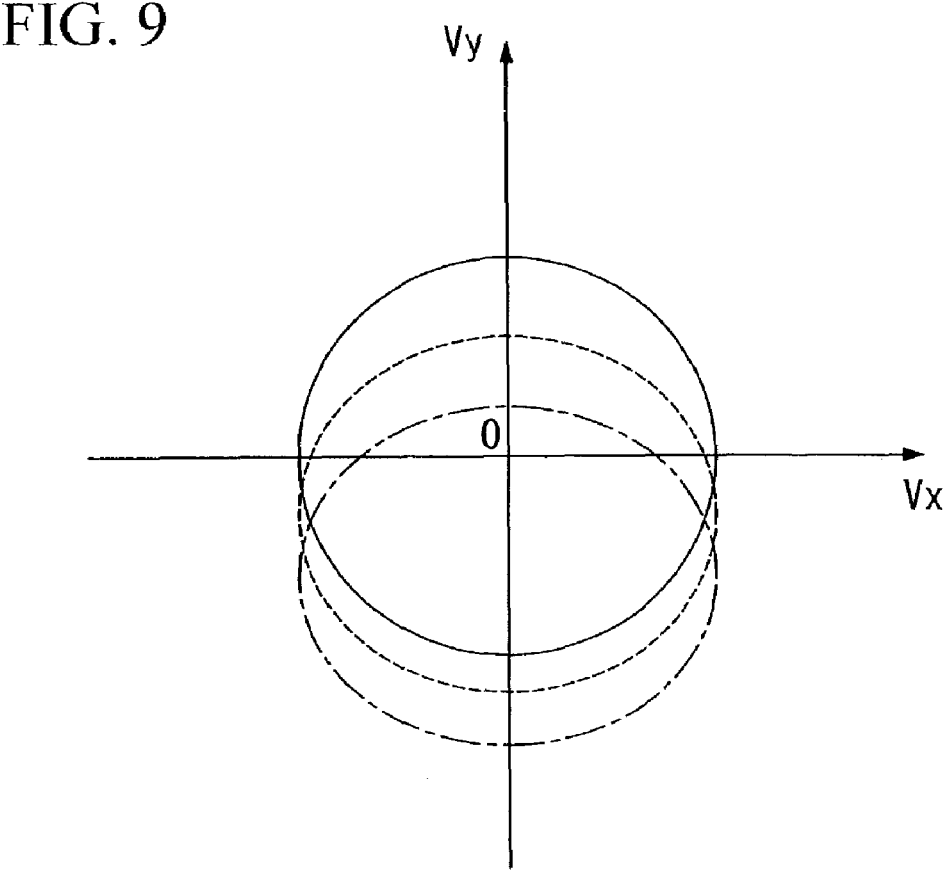
FIG. 9 diagrammatically shows relationships between outputs of an XY-axes geomagnetic sensor with respect to various inclined states of the digital camera.
Figure 10:
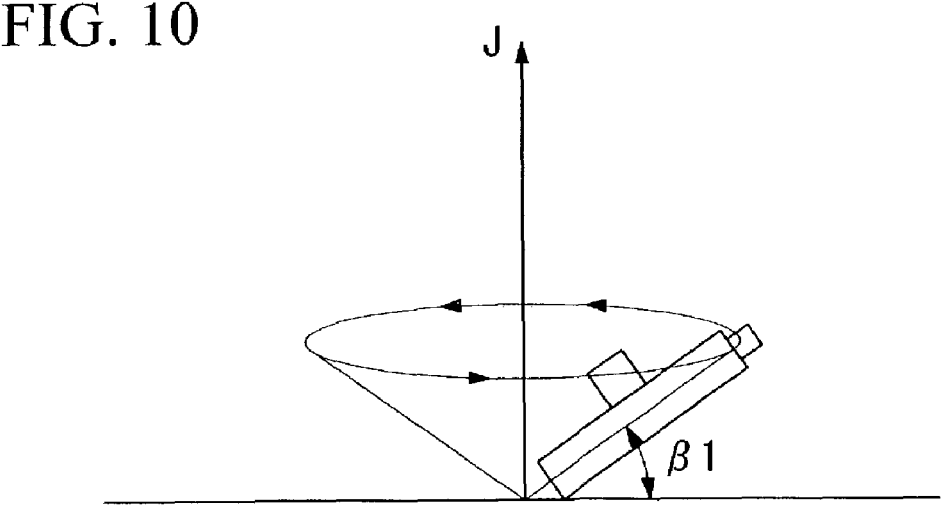
FIG. 10 diagrammatically shows an inclined state of the digital camera.

Next, calculations regarding the bearing angle and inclined angle will be described with reference to FIGS. 9 and 10.

In general, the geomagnetism has a prescribed direction having a prescribed angle against the horizontal plane, and the angle of the geomagnetism varies in response to terrestrial locations on the earth. When the digital camera 1 is held substantially in parallel with the horizontal plane and is rotated at a certain terrestrial location, for example, an X-axis component Vx of the output of the XY-axes geomagnetic sensor 5 varies along with a sine-wave curve while a Y-axis component Vy also varies along with another sine-wave curve, which differs from the sine-wave curve of the X-axis component Vx in phase by 90°. That is, the aforementioned components Vx and Vy may be varied along the same locus that approximately matches a true circle drawn about an origin 'O', which is shown using a solid line in FIG. 9. Herein, the direction of the geomagnetism does not completely match the horizontal plane but is inclined by a certain angle in response to the terrestrial location on the earth. When the digital camera 1 is inclined by an angle β, an angle formed between the direction of the geomagnetism and the Y-axis positive direction of the digital camera 1 is varied, so that the Y-axis component Vy should be correspondingly varied. For example, when the digital camera 1 is inclined by an angle β 1 against the horizontal plane and is rotated about the perpendicular line 'J' as shown in FIG. 10, the aforementioned components Vx and Vy may be varied along the same locus that substantially matches an elliptical circle, which is shown using a dotted line in FIG. 9. Compared with the origin of the 'solid' true circle shown in FIG. 9, the origin of the 'dotted' elliptical circle is moved in a Y-axis negative direction with respect to the Y-axis component Vy. When the digital camera 1 is inclined by an angle β 2 that is greater than β 1 and is rotated about the perpendicular line J, the aforementioned components Vx and Vy may be varied along the same locus that substantially matches an elliptical circle, which is shown using a dashed line in FIG. 9, wherein the short axis is reduced and the origin is further moved in the Y-axis negative direction compared with the 'dotted' elliptical circle.

When the digital camera 1 is held at the same location (i.e., same latitude and longitude on the earth) at which the direction of the geomagnetism remains to have a constant angle against the horizontal plane, the X-axis component Vx and Y-axis component Vy of the output of the XY-axes geomagnetic sensor 5 are varied along the same 'constant' locus; therefore, it is possible to specify a bearing angle and an inclined angle of the digital camera 1 based on the aforementioned values Vx and Vy. The present embodiment is designed under an assumption that the digital camera 1 is held within a prescribed range of locations at which the direction of the geomagnetism remains to have a substantially constant angle against the horizontal plane. Therefore, the aforementioned ROM incorporated in the decoder 16 stores a conversion table showing relationships between the values of Vx and Vy, bearing angles, and inclined angles, which are measured in advance under the aforementioned assumption.

Incidentally, the aforementioned ROM incorporated in the decoder 16 does not necessarily store a single conversion table for storing measurement data with regard to a prescribed terrestrial location (i.e., latitude and longitude); therefore, the aforementioned ROM can store various conversion tables for storing various measurement data with regard to numerous terrestrial locations (i.e., latitudes and longitudes). Alternatively, it is possible to incorporate a communicator and a writable memory (e.g., RAM) into the digital camera 1, so that the user can freely operate the digital camera 1 to download the content of a conversion table arbitrarily selected in response to an arbitrary terrestrial location (i.e., latitude and longitude) to use the digital camera 1. In addition, a prescribed shop or store may sell digital cameras having ROMs that store contents of conversion tables corresponding to various terrestrial locations. Furthermore, it is possible to incorporate a GPS (Global Positioning System) module into the digital camera 1, which can receive latitude information and longitude information from a GPS base station with respect to a present location thereof. Herein, the digital camera 1 may correct or optimize the content of a conversion table that is read from the ROM in response to the latitude information and longitude information, thus accurately detecting a bearing angle and an inclined angle therefor.

In step 106, the decoder 16C makes a decision as to whether or not either an inequality of $Vx \geq 1$ (Oe) or an inequality of $Vy \geq 1$ (Oe) is established.

If 'YES' in step 106, it can be determined that the shutter button 4 is operated by the user. In that case, the decoder 16C outputs an image pickup ON signal allowing an image pickup operation to the control circuit 20. Upon reception of the image pickup ON signal from the decoder 16C, the control circuit 20 sends it to the image pickup circuit 26 via a data bus 30.

That is, the flow proceeds to step 108 in which the image pickup circuit 26 picks up an image of an object on the image pickup device arranged on the focusing plane via the lens 2. At this time, prescribed image pickup data such as the time and date, and the bearing are simultaneously recorded together with the image of the object.

Figure 7:
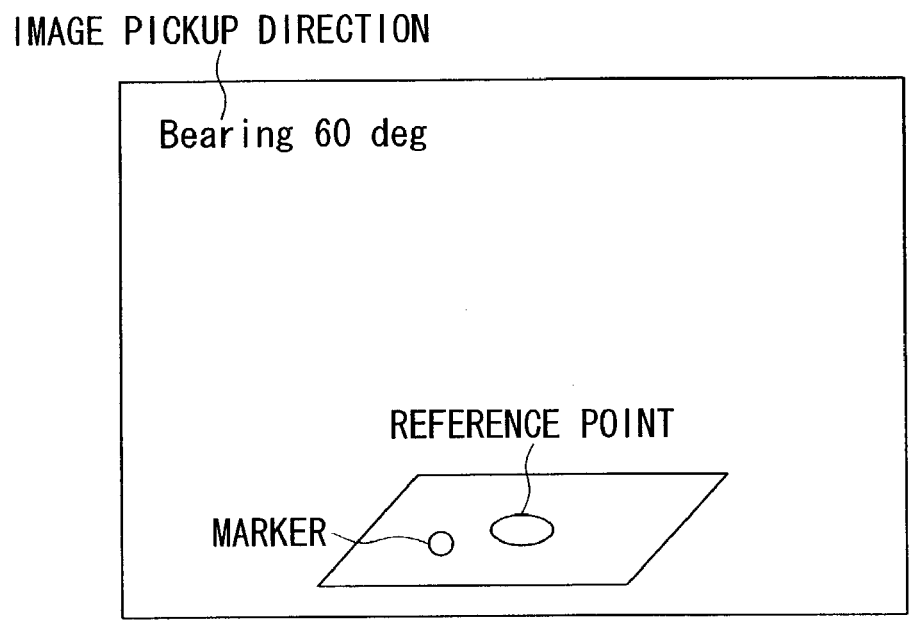
FIG. 7 shows an example of an image displayed on the screen of a viewfinder of the digital camera, which is not held horizontally.

If 'NO' in step 106, the flow proceeds to step 107 in which the viewfinder display circuit 24 receives data of bearing and inclined angles from the control circuit 20, so that it controls the viewfinder to display an image pickup direction and a degree of levelness on the screen, an example of which is shown in FIG. 7.

Figure 8:
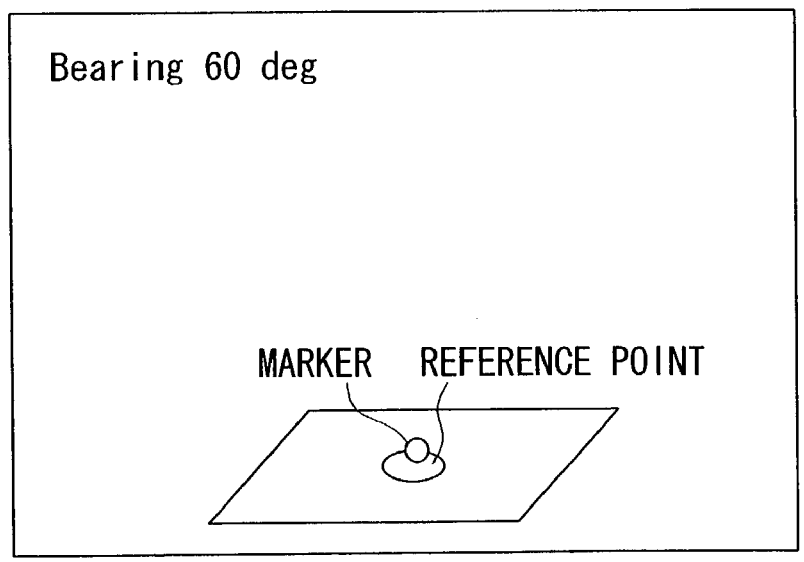
FIG. 8 shows an example of an image displayed on the screen of the viewfinder of the digital camera, which is held horizontally.

FIG. 7 shows an example of an image displayed on the screen of the viewfinder under a prescribed condition where the digital camera 1 is not held horizontally, wherein a marker representing a positional deviation of the digital camera 1 from the horizontal plane is out of a reference-point area on a plane. Herein, the user can adjust the digital camera 1 in inclination and position such that the marker is moved towards the reference-point area on the plane in the viewfinder. FIG. 8 shows another example of the image displayed on the screen of the viewfinder in which the marker substantially matches the reference-point area on the plane. Thus, the user can easily adjust the digital camera 1 in inclination and position by controlling the marker to substantially match the reference-point area on the plane displayed on the screen of the viewfinder.

After completion of the foregoing step 107 or 108, the flow proceeds to step 109 shown in FIG. 6, wherein a decision is made as to whether or not the image pickup operation is ended. This decision can be realized mechanically by making a decision as to whether or not the shutter button 4 is not being operated for a prescribed time period or more.

If 'NO' in step 109, the user may have no intention to end the image pickup operation, so that the flow proceeds back to the foregoing step 104. Thus, the aforementioned operations are repeated by the digital camera 1. If 'YES' in step 109, it is determined that the user would like to end the image pickup operation, so that the flow proceeds to following steps 110 to 112 in FIG. 6. In step 110, the image pickup circuit 26 clears image pickup conditions that were set up in the foregoing step 102. In step 111, an OFF control signal is supplied to the XY-axes geomagnetic sensor 5. In step 112, the power switch in the manual operator section 22 is turned off. Thus, it is possible to completely end the image pickup operation.

The present embodiment is described with respect to the digital camera 1, which is an example of the image pickup apparatus of this invention. That is, this invention is not necessarily limited to the present embodiment and is therefore applicable to other types of image pickup apparatuses such as an electronic still camera and a video movie camera, for example.

Lastly, this invention has a variety of effects and technical features, which will be described below.

(1) An image pickup apparatus of this invention incorporates a geomagnetic sensor for realization of various functions regarding image pickup operations, such as measurement of image pickup directions, measurement of levelness in image pickup operations, and switching controls of a shutter button, for example. Therefore, the user of a digital camera, which is an example of the image pickup apparatus of this invention, is able to confirm an image pickup direction (or a bearing angle) and a degree of levelness while watching an object in a viewfinder. In addition, it is possible to record various image pickup data such as the time and date, image pickup direction, and the like together with an image of an object. Thus, this invention can realize a wide diversity of utilities in image pickup apparatuses.

(2) The image pickup apparatus of this invention uses a shutter mechanism of a non-contact switch type interlocked with the geomagnetic sensor. That is, the shutter mechanism of this invention can be made with a simple structure without using unnecessary parts such as springs and metal contacts, which may cause failures. Thus, this invention can realize image pickup apparatuses that are highly unlikely to fail due to contact problems.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An image pickup apparatus comprising:
   an image pickup device for picking up an image of an object;
   a shutter button having a magnetic member thereunder;
   an XY-axes geomagnetic sensor that is interlocked with the shutter button such that when pressed, the magnetic member approaches the XY-axes geomagnetic sensor to apply a magnetic field that is sufficiently greater than general geomagnetism;
   a decoder for decoding an output of the XY-axes geomagnetic sensor to produce a bearing angle and an inclined angle based on a horizontal plane;
   a viewfinder display for displaying the bearing angle and the inclined angle on a screen;
   a memory adapted to the decoder for storing relationships between the geomagnetism, the bearing angle, and the inclined angle with respect to a prescribed terrestrial location, wherein the decoder produces the bearing angle and the inclined angle with reference to the relationships stored in the memory and on the basis of the output of the XY-axes geomagnetic sensor; and
   a control circuit for automatically controlling the image pickup device to perform an image pickup operation when the output of the XY-axes geomagnetic sensor satisfies a prescribed condition.

2. An image pickup apparatus according to claim 1, wherein the viewfinder display displays the bearing angle together with an animated image representing deviation of a present position in levelness from the horizontal plane on the screen.

3. An image pickup apparatus according to claim 1, further including a second decoder to detect as to whether or not the shutter button is pressed based on an output of the XY-axes geomagnetic sensor.

4. An image pickup apparatus according to claim 1, wherein the viewfinder display further displays a degree of levelness based on the inclined angle.

* * * * *